United States Patent [19]

Kudo et al.

[11] 4,150,066

[45] Apr. 17, 1979

[54] FLAME-RETARDING RESIN COMPOSITION

[75] Inventors: Teizo Kudo; Shoji Furukawa, both of Sakai, Japan

[73] Assignee: Daicel Ltd., Sakai, Japan

[21] Appl. No.: 851,982

[22] Filed: Nov. 16, 1977

[30] Foreign Application Priority Data

Nov. 22, 1976 [JP] Japan ................................. 51-140460
Sep. 5, 1977 [JP] Japan ................................. 52-106477

[51] Int. Cl.² ...................... C08L 51/04; C08L 55/02; C08L 57/03
[52] U.S. Cl. .......................... 260/876 R; 260/45.75 B; 260/45.95 H
[58] Field of Search .................... 260/876 R, 45.75 B, 260/45.95 B

[56] References Cited

U.S. PATENT DOCUMENTS

| 3,494,982 | 2/1970 | Grabowski et al. | 260/876 R |
|---|---|---|---|
| 3,509,237 | 4/1970 | Aubrey | 260/880 |
| 3,515,774 | 6/1970 | Lee | 260/876 R |
| 3,852,394 | 12/1974 | Kubota et al. | 260/45.7 RL |

*Primary Examiner*—J. Ziegler
*Attorney, Agent, or Firm*—Blanchard, Flynn, Thiel, Boutell & Tanis

[57] ABSTRACT

A flame-retarding resin composition consists essentially of (A) a graft copolymer obtained by bulk and suspension-polymerizing an aromatic monoalkenyl monomer and a vinylcyano monomer and/or a monomeric alkyl ester of acrylic acid or methacrylic acid in the presence of a diene type rubber component, as an optional ingredient (B) a graft copolymer obtained by emulsion-polymerizing a monomeric mixture of the above mentioned monomers in the presence of a diene type rubber latex, (C) a chlorinated polyethylene having a degree of chlorination of 25 to 45 wt. %, (D) tetrabromo-bisphenol A or a derivative thereof and (E) antimony trioxide.

7 Claims, No Drawings

FLAME-RETARDING RESIN COMPOSITION

BACKGROUND OF THE INVENTION

1. Field of the Invention

The present invention relates to a highly flame-retardant, impact-resistant resinous composition having an excellent mechanical strength and a good moldability.

More specifically, the present invention relates to a highly flame-retardant, impact-resistant resinous composition excellent in the impact resistance, thermal stability, moldability and gloss, which consists essentially of (A) a graft copolymer obtained by bulk-polymerizing and suspension-polymerizing an aromatic monoalkenyl monomer and a vinylcyano monomer and/or a monomeric alkyl ester of acrylic acid or methacrylic acid in the presence of a diene type rubber component, optionally (B) a graft copolymer obtained by emulsion-polymerizing a monomeric mixture of the above-mentioned monomers in the presence of a diene type rubber latex, (C) a chlorinated polyethylene having a degree of chlorination of 25 to 45% by weight, (D) tetrabromobisphenol A or a derivative thereof and (E) antimony trioxide.

2. Description of Prior Arts

Recently, application fields of plastic materials have been broadened, and ABS resins are used as automobile parts, electric equipments, construction materials and other various molded articles in various fields because of their excellent impact resistance and moldability. However, with such broadening of application fields, various severe legal regulations are imposed on these plastic materials, and flame-retardant materials are now required to have not only a self-extinguishing property but also such a property that "flaming drippings" is not caused to occur at the time of combustion.

As means for rendering combustible ABS resins flame-retardant, there has generally been adopted a method in which at least one member selected from relatively low-molecular-weight organic flame retardants containing halogens in large quantities, halogen-containing polymers such as polyvinyl chloride, and inorganic compounds such as antimony trioxide is incorporated in an ABS resin. It is known that in order to impart to ABS resins such high flame retardancy that "flaming drippings" is not caused at the time of combustion, it is effective to use a halogen-containing organic compound, especially a halogen-containing polymer such as polyvinyl chloride, chlorinated polyethylene or the like, and antimony trioxide in combination.

As the typical method for production of ABS resins, there are known bulk-suspension polymerization and emulsion polymerization methods. For example, when an ABS resin is prepared according to the emulsion polymerization method, since a mixture of vinyl monomers is grafted to a rubber latex, the rubber content in the resin can optionally be changed. Further, since the particle size of the rubber latex is sufficiently small, a molded article of an ABS resin prepared by the emulsion polymerization method has an excellent gloss. However, an emulsifier or coagulant used in the preparation method is left in the resulting resin and has bad influences on the mechanical properties and thermal stability of the resin. Especially in the case a halogen-containing organic flame retardant and antimony trioxide are incorporated in such ABS resin in order to render it flame-retardent, if impurities such as the emulsifier and coagulant are left in the ABS resin, they promote combustibility of the ABS resin and excessive amounts of halogen and antimony components should be incorporated. Moreover, these impurities promote decomposition of the halogen-containing flame retardant. As a result, there are caused various troubles such as discoloration of the resin at the molding step and corrosion of an injection molding machine or a mold.

An ABS resin prepared by the bulk-suspension polymerization method is free of the above-mentioned impurities such as the emulsifier. Accordingly, this ABS resin has a good thermal stability, and when a flame retardant is incorporated in this ABS resin, the amount of the halogen or antimony component necessary for rendering the ABS resin flame-retardant can be reduced more than the case of the ABS resin obtained by the emulsion polymerization method. Further, the discoloration at the molding step can be remarkably reduced.

As another rubber-modified impact-resistant resin, there can be mentioned high-impact polystyrene. It is known that a larger amount of a flame retardant should be incorporated into an ABS resin than in this high-impact polystyrene if it is intended to attain the same level of the flame retardancy. Accordingly, high techniques are required for rendering ABS resins flame-retardant without other desired characteristics of ABS resins, namely higher impact resistance, rigidity and chemical resistance than those of the high-impact polystyrene. Chlorinated polyethylene which is often used as a flame retardancy-imparting component is poor in the compatibility with high-impact polystyrene, and therefore, even if chlorinated polyethylene is incorporated in high-impact polystyrene, the improvement of the impact resistance cannot be expected and such undesirable phenomena as reduction of the rigidity and laminar peeling are caused. Accordingly, from the practical viewpoint, the amount of chlorinated polyethylene incorporated into high-impact polystyrene should be limited to about 10% or less. In contrast, chlorinated polyethylene has a good compatibility with an ABS resin, and it is seen that when chlorinated polyethylene is incorporated into an ABS resin, the impact resistance is improved in proportion to the amount of chlorinated polyethylene incorporated. It is known that by incorporating a relatively large amount of chlorinated polyethylene into an ABS resin, it is made possible to render the ABS resin flame-retardant and compensate for reduction of the impact resistance caused by incorporation of antimony trioxide or the like. However, although the impact resistance is thus improved by incorporation of chlorinated polyethylene, the rigidity and moldability of the final resinous composition are reduced and the inherent characteristics of the ABS resin are considerably lost. In order to render an ABS resin highly flame-retardant while maintaining inherent characteristics of the ABS resin as much as possible, it is desirable to incorporate into the ABS resin chlorinated polyethylene, antimony trioxide and a halogen-containing organic flame retardant in an appropriate combination in minimum amounts.

SUMMARY OF THE INVENTION

As a result of our research works made with a view to providing a highly flame-retardant, highly impact-resistant resinous composition excellent in the mechanical strength and moldability by using ABS resin prepared by the bulk-suspension polymerization method and utilizing the combination of chlorinated polyethylene, a halogen-containing organic flame retardant and antimony trioxide and in addition, optionally the emulsion-polymerized ABS resin, we have now completed the present invention.

More specifically, the present invention relates to a flame-retardant resinous composition comprising 100 parts by weight of a mixture of at least 20% by weight of (A) a graft copolymer obtained by polymerizing an aromatic monoalkenyl monomer and a vinylcyano monomer and/or a monomeric alkyl ester of acrylic acid or methacrylic acid in the presence of a diene type rubber component under bulk polymerization conditions and continuing the polymerization under suspension polymerization conditions to substantially complete the polymerization and up to 80% by weight of (B) a graft copolymer obtained by polymerizing an aromatic monoalkenyl monomer and a vinylcyano monomer and/or a monomeric alkyl ester of acrylic acid or methacrylic acid with a diene type rubber latex under emulsion polymerization conditions, 1 to 12 parts by weight of (C) a chlorinated polyethylene having a degree of chlorination of 25 to 45% by weight, 5 to 25 parts by weight of (D) tetrabromobisphenol A or a derivative thereof and 2 to 10 parts by weight of (E) antimony trioxide.

The present invention also provides a preferable composition including 100 parts of a graft copolymer prepared according to the bulk-suspension polymerization, not using any emulsion polymerized graft copolymer. There is provided another preferable composition in which the bulk-suspension graft copolymer and the emulsion graft compolymer are containing in a blend ratio of the bulk suspension graft copolymer to the emulsion graft copolymer of 20/80 to 90/10 by weight.

According to this invention, the composition including the graft copolymer (A) is very much improved in the flame-retarding property. It is added that the composition including the both graft copolymers (A) and (B) is improved in the gloss as well as the flame-retarding property.

In general, ABS resin prepared according to the bulk-suspension polymerization method is free of impurities contained in an ABS resin prepared by the emulsion polymerization method, such as an emulsifier, a coagulant and the like. For this reason or the like reason, in order to attain the same level of the flame retardancy, the necessary amount of the flame retardant is ordinarily smaller in the ABS resin prepared by the bulk-suspension method than in the ABS resin prepared according to the emulsion polymerization method. However, because of the process limitation, in case of the ABS resin prepared according to the bulk-suspension polymerization process, the rubber content in the resin is relatively low and therefore, there is observed a defect that the impact strength, one of important characteristics of the ABS resin, is low and this defect is made conspicuous by addition of a flame retardant. It is seen that when an ABS resin prepared according to the emulsion polymerization method, which has a higher rubber content, is incorporated into such ABS resin prepared according to the bulk-suspension polymerization method, the impact resistance is improved in the resulting resinous composition and when a flame retardant is incorporated in this resinous composition, the effect observed in case of the ABS resin prepared according to the bulk-suspension polymerization method, namely the effect that the amount of the flame retardant necessary for attaining a certain level of the flame retardancy can be reduced, can be attained. Moreover, this resinous composition has a good thermal stability. Especially, when the flame retardant system used in the present invention, which comprises chlorinated polyethylene, tetrabromo-bisphenol A or its derivative and antimony trioxide, is employed, advantages expected in the case of the ABS resin prepared according to the bulk-suspension method can be attained substantially completely in case of the above-mentioned resinous composition. Accordingly, by mixing an ABS resin prepared according to the bulk-suspension polymerization method and an ABS resin prepared according to the emulsion polymerization method and incorporating the above flame retardant system into the mixture, there can be obtained a flame-retardant resinous composition excellent in the mechanical properties, moldability and thermal stability.

The effect on combustion of plastics and flame retardancy of plastics caused various flame retardants involves a complicated mechanism including various chemical and physical phenomena, and at the present, such mechanism is not completely elucidated. However, in general, combustion of plastics is an oxidation reaction of combustible gases formed by thermal decomposition of plastics. It is construed that "flaming dripping" cause during this combustion is due to flow of the plastics by combustion heat, and that if a halogen-containing organic flame retardant is present, an incombustible gas of a halogen compound is generated to block air from the combustion surface and catch radicals of the combustible gas being subjected to the oxidation reaction to thereby prevent combustion. Antimony trioxide per se has no flame-retardant effect, but in the presence of a halogen, it forms a antimony halide to promote migration of the halogen and simultaneously, it enhances the radical-catching effect. Chlorinated polyethylene exerts the above-mentioned flame-retardant effect by the halogen and at the same time, it prevents the flow of plastics by combustion heat owing to gelation of double bonds formed in the polymer main chain by dehydrochlorination. Moreover, formation of char is promoted and an effect of preventing "flaming dripping" during combustion is manifested.

As a result of our research works made with a view to preventing "flaming dripping" by incorporating chlorinated polyethylene, a halogen-containing organic flame retardant and antimony trioxide into an ABS resin, it was found that although the above-mentioned three flame retardant components should be incorporated in amounts exceeding certain levels, there is caused a surprising phenomenon that if the amount of chlorinated polyethylene alone is increased beyond a certain level in a resinous composition comprising an ABS resin prepared according to the bulk-suspension method and an ABS resin prepared according to the emulsion polymerization method, in which a high flame retardancy is attained by incorporation of chlorinated polyethylene, tetrabromo-bisphenol A or its derivative and antimony trioxide, the resinous composition becomes combustible again, and in order to render this composition flame-retardant again, it is necessary to increase the amounts of other flame retardant components, namely tetrabromobisphenol A or its derivative and antimony trioxide. More specifically, when 1 to 12 parts by weight of chlorinated polyethylene is used for 100 parts by weight of a resinous composition comprising an ABS resin prepared according to the bulk-suspension polymerization method and as an optional ingredient an ABS resin prepared according to the emulsion polymerization method, the sum of the amounts of tetrabromo-bisphenol A and antimony trioxide necessary for attaining the flame retardancy not causing "flaming dripping" is within a certain range, but when the amount of chlorinated polyethylene is increased beyond the above-mentioned range, the sum of the amounts of the halogen and antimony trioxide necessary for rendering the resinous composition flame-retardant is drastically increased. In this case, the physical properties of the resinous composition should naturally be degraded by the increased amounts of the flame retardant components, and the resulting resinous composition is not advantageous from the economical viewpoint because the flame retardants are more expensive than the resins. When chlorinated polyethylene is used in an amount not exceeding 12 parts by weight per 100 parts by weight of the resins, the flame retardant action of bromine in tetrabromo-bisphenol A and antimony is well blanced with the gelation phenomenon and it is possible to render an ABS resin composition flame-retardant with relatively small amounts of the flame retardant components. According to the conventional techniques, chlorinated polyethylene which is a relatively cheap flame retardant is used in a large amount so as to improve the impact resistance as well as the flame retardant effect, and therefore, other flame retardant components, namely antimony trioxide and a halogen-containing organic flame retardant, should be incorporated in larger amounts. The reason why the amounts of the flame retardant components should be increased for attaining the intended flame retardant effect when the amount of chlorinated polyethylene exceeds 12 parts by weight per 100 parts by weight of the ABS resin has not been elucidated. It may only be said that the combustion mechanism will probably be changed. For example, it is construed that the gelation effect by chlorinated polyethylene increases over the air-blocking effect by the halogen and antimony in the gas phase and the action of catching radicals for the oxidation reaction, and the combustion surface is renewed by reduction of the flow of the resin by combustion heat or is increased by the change of the heat conductivity of the resinous composition, which results in increases of the necessary amounts of the flame retardant components.

As the diene type rubber components that is used for the graft copolymer (A) by the bulk-suspension method in the present invention, there may be used butadiene type rubbers, isoprene type rubbers and a copolymer of such a diene monomer and styrene or acrylonitrile. Among them, a polybutadiene or butadiene-styrene copolymer rubber having a relatively high stereoregularity, which is synthesized by using lithium or an organic metal compound catalyst, is especially preferred. The amount used of the diene type rubber components is not particularly critical. In general, the diene type rubber component is used in an amount of 2 to 40 parts by weight, preferably 2 to 20 parts by weight, per 100 parts by weight of a mixture of vinyl monomers. The average size of the dispersed rubber particles is 0.2 to 2.0 $\mu$, preferably 0.3 to 1.2 $\mu$.

Styrene is most preferred as the aromatic monoalkenyl monomer that is used for the graft copolymer (A). In addition, substituted styrenes such as $\alpha$-methylstyrene and p-methylstyrene may be used, and also a mixture of such substituted styrene with styrene can be used. Acrylonitrile is most preferred as the vinylcyano monomer, but methacrylonitrile or the like may be used.

As to an alkyl ester monomer of acrylic acid or methacrylic acid, there is preferred an ester having an alkyl of one to 18 carbon atoms, especially methyl methacrylate. The mixing ratio of the aromatic monoalkenyl monomer and the vinylcyano monomer and/or the alkyl ester of acrylic acid or methacrylic acid is not particularly critical, but in general, a monomeric mixture comprising 80 to 55% by weight of the aromatic monoalkenyl monomer, 0 to 45% by weight of the vinylcyano monomer and 0 to 45 wt % of said alkyl ester is employed. The total amount of the vinylcyano monomer and the alkyl ester is from 20 to 45 wt %.

The kinds and amounts of the polymerization initiator and molecular weight adjusting agents that are used for the preparation of the graft copolymer (A) in the present invention are not particularly critical, and known agents may be used in known amounts. In some case, it is possible to perform bulk polymerization and suspension polymerization separately and incorporate the products obtained at both the steps simultaneously. Further, the suspensing dispersant is not particularly critical, and for example, there can be used so-called organic protective colloids such as polyvinyl alcohol and hydroxyethyl cellulose, and fine powders of inorganic salts such as calcium phosphate and magnesium hydroxide. Also the temperature condition is not particularly critical. In general, it is preferred that the bulk polymerization be carried out at 60 to 100° C. and the suspension polymerization be carried out at 60 to 140° C. The graft copolymer (A) includes a blend of the graft copolymer obtained according to the above-mentioned bulk-suspension polymerization method with a copolymer obtained from a mixture of the same monomers by the suspension polymerization method, the bulk polymerization method or the bulk-suspension polymerization method.

Customary emulsion polymerization conditions are applied to the production of the graft copolymer (B) in the present invention. As the diene type rubber latex, there can be mentioned a polybutadiene latex and a latex of a copolymer of butadiene with styrene, acrylonitrile or a vinyl monomer such as methyl methacrylate. Not only a substantially uncrosslinked rubber but also a crosslinked, gel-containing rubber latex can be used in the present invention. The amount of the diene type rubber latex is not particularly critical, but in general, the latex is used in an amount of 10 to 100 parts by weight per 100 parts by weight of a mixture of vinyl monomers. The average size of the dispersed rubber particles of the diene type rubber latex is 0.05 to 0.5 $\mu$, preferably 0.1 to 0.3 $\mu$.

The same aromatic monoalkenyl monomer and vinylcyano monomer as mentioned above with respect to the graft copolymer (A) can be used for the production of the graft copolymer (B). The mixing ratio of the vinyl monomers is not particularly critical, but in general, there is employed a mixture comprising 55 to 80% by weight of the aromatic monoalkenyl monomer, 0 to 45 % by weight of the vinylcyano monomer and 0 to 45 % by weight of the alkyl ester of acrylic or methacrylic acid. These vinyl monomers may be added entirely at one time at the start of polymerization, but in some cases, they may be added continuously or dividely in stages.

As the surface active agent that is used for preparing the graft copolymer (B) according to the emulsion polymerization method, there can be mentioned, for example, anionic surface active agents such as sodium alkylbenzene-sulfonates, sodium salts of sulfuric acid esters of higher alcohols, sodium and potassium salts of disproportioned rosin acid, and sodium and potassium salts of higher fatty acids. As the polymerization initiator, there may be used, for example, persulfates such as potassium presulfate, hydroperoxides such as p-methane hydroperoxide, and combination initiators such as cumene hydroperoxide-Fe++-glucose. As the molecular weight regulating agent, there can be used known agents. Incidentally, the graft copolymer (B) includes a blend of the graft copolymer obtained according to the above-mentioned emulsion polymerization method with other copolymer prepared from a mixture of the same vinyl monomers according to the emulsion polymerization method.

If the graft copolymer (B) is mixed in the composition of this invention, the mixing ratio of the graft copolymers (A) and (B) in the present invention is preferably such that the amount of the graft copolymer (A) is 20 to 90 % by weight more preferably 30 to 85% by weight and the amount of the graft copolymer (B) is 10 to 80% by weight, more preferably 15 to 70% by weight.

A highly flame-retardant resinous composition of the present invention formed by incorporating the flame retardant components into a resinous composition comprising the graft copolymers (A) and (B) at the above mixing ratio has well-balanced physical properties. More specifically, discoloration at the molding-step and corrosion of an injection molding machine or mold, which are inevitable in resins prepared according to the emulsion polymerization, are hardly caused in the resinous composition of the present invention, and an excellent thermal stability possessed by resins formed by bulk-suspension polymerization, which hardly contain impurities, can be retained in the resinous composition of the present invention. Furthermore, the mechanical strength of the resinous composition of the present invention is very high.

The content of the rubber component in the composition of the present invention is 3 to 40% by weight, preferably 5 to 30% by weight, based on the sum of the graft copolymers (A) and (B).

The composition of the present invention may further comprise a copolymer of vinyl monomers. More specifically, as one embodiment the present invention includes a flame-retardant resinous composition comprising 100 parts by weight of a mixture of the graft copolymer (A) or a blend of this graft copolymer (A) with a copolymer obtained from a mixture of the same monomer as in the polymer (A) by the suspension, bulk or bulk-suspension polymerization method and the graft copolymer (B) or a blend of the graft copolymer (B) with a copolymer obtained from a mixture of the same monomers as in the copolymer (B) by the emulsion polymerization method, (C) 1 to 12 parts by weight of a chlorinated polyethylene having a degree of chlorination of 25 to 45% by weight, (D) 5 to 25 parts by weight of tetrabromo-bisphenol A or a derivative thereof and (E) 2 to 10 parts by weight of antimony trioxide. In this composition, the ingredient (B) or its blend are optional.

The chlorinated polyethylene (C) having a degree of chlorination of 25 to 45 % by weight, that is used in the present invention, is formed by chlorinating polyethylene, an ethylene-propylene copolymer or an ethylene-butene copolymer according to a customary method. It is preferred that bonded chlorine atoms be distributed in the polymer as uniformly as possible and residual crystals degrading actions as the rubber be hardly present.

The chlorinated polyethylene is incorporated in an amount of 1 to 12 parts by weight per 100 parts by weight of the sum of the graft copolymers (A) and (B). If the amount of the chlorinated polyethylene is smaller than 1 part by weight, attainment of the flaming-dripping-preventing effect cannot be expected, and if the amount of the chlorinated polyethylene is larger than 12 parts by weight, as pointed out hereinbefore, the amounts of other flame retardant components should be increased for attaining the intended high flame retardancy, and therefore, physical properties of the resinous composition are degraded and economical disadvantages are brought about.

As another flame retardant (D), there is employed tetrabromo-bisphenol A or a derivative thereof such as a hydroxyalkyl ester having 2 to 3 carbon atoms, hydroxyhalogenated alkyl ether compound or oligomer of tetrabromo-bisphenol A. The intended effects of the present invention can be attained only when this flame retardant (D) is used in combination with other flame retardants (C) and (E).

Antimony trioxide (E) is a component indispensable for obtaining a resinous composition having a high flame retardancy at a high efficiency. If antimony is not used and it is intended to attain the object by using the halogen alone, the halogen must be used in an extremely large amount. The tetrabromo-bisphenol A (D) and antimony trioxide (E) are in amounts of 5 to 25 parts by weight and 2 to 10 parts by weight, respectively, when the sum of the graft copolymers (A) and (B) is 100 parts by weight and the amount of the chlorinated polyethylene (C) is 1 to 12 parts by weight. If these components (D) and (E) are used in smaller amounts, the intended flame retardancy cannot be attained. If they are used in large amounts, the flame retardancy becomes excessive, the physical properties of the final resinous composition are reduced and economical disadvantages are brought about.

In addition to the foregoing indispensable components, the resinous composition of the present invention may further comprise additives customarily used in this field, such as a thermal stabilizer, an antioxidant, a lubricant, a coloring material and the like.

In the present invention, mixing of the graft copolymers (A) and (B), chlorinated polyethylene (C), tetrabromo-bisphenol. A type flame retardant (D) and antimony trioxide (E) can be accomplished without any particular means or addition order by using a customary mixing apparatus such as a heat roll, a Banbury mixer or an extruder. As mentioned above, this invention provides another composition having very improved flame-retarding property, which consists essentially of 100 parts by weight of a graft copolymer (A) obtained by polymerizing an aromatic monoalkenyl monomer and a vinylcyano monomer and/or a monomeric alkyl ester of acrylic ester or methacrylic acid in the presence of a diene type rubber component under bulk polymerization conditions and continuing the polymerization under suspension polymerization conditions to substantially complete the polymerization, 1 to 12 parts by weight of a chlorinated polyethylene (C) having a degree of chlorination of 25 to 45% by weight, 5 to 25 parts by weight of tetrabromo-bisphenol A or a derivative thereof (D) and 2 to 10 parts by weight of antimony trioxide (E). This composition also provides the same effects and advantages as in case of the composition including the graft copolymers (A) and (B).

Furthermore, a preferable amount of a chlorinated polyethylene is from 3 to 12 parts by weight based on 100 parts of the graft copolymers, more preferably 3 to 10 parts.

The present invention will now be described in detail by the following Examples, in which all of "parts" are by weight.

REFERENTIAL EXAMPLE

[Preparation of Graft Copolymers]

Graft Copolymer (A)-1:

A composition comprising the following components was charged in a closed type reaction vessel equipped with a strong stirrer. After the rubber component was completely dissolved, the temperature was elevated to 70° C. and bulk polymerization was conducted for 4 hours.

| Composition X: | |
|---|---|
| Styrene-butadiene rubber (Tafden 2000A manufactured by Asahi Kasei Kogyo) | 15 parts |
| Styrene | 72 parts |
| Acrylonitrile | 28 parts |
| Benzoyl peroxide | 0.15 part |
| Dicumyl peroxide | 0.08 part |
| t-Dodecyl mercaptan | 0.35 part |

The resulting reaction mixture was transferred into another closed type reaction vessel filled with an aqueous dispersion comprising 100 parts of water, 4 parts of magnesium hydroxide and 0.05 part of sodium laurate, and the mixture was suspended in the aqueous dispersion by stirring. Then, the temperature was elevated to 120° C. and suspension polymerization was conducted for 5 hours. The resulting polymer particles were cooled, and the dispersant was decomposed by hydrochloric acid and the product was washed with water and dried. The so obtained graft copolymer is designated as "copolymer (A)-1." The average rubber particle size of this graft copolymer (A)-1 was 0.8 μ.

Graft Copolymer (A)-2:

| | Composition Y | Composition Z |
|---|---|---|
| Styrene-butadiene rubber (Tafden 2000A manufactured by Asahi Kasei Kogyo) | 8 parts | |
| Styrene | 62 parts | 10 parts |
| Acrylonitrile | 28 parts | |
| Benzoyl peroxide | 0.15 part | |
| Dicumyl peroxide | 0.08 part | |
| t-Dodecyl mercaptan | 0.25 part | 0.20 part |

The above composition Y was charged in a closed type reaction vessel equipped with a strong stirrer, and after the rubber component was completely dissolved the temperature was elevated to 70° C. and bulk polymerization was conducted for 4 hours. At this point, the above composition z was added and the mixture was agitated for 10 minutes.

The resulting reaction mixture was transferred into another closed type reaction vessel filled with an aqueous dispersion comprising 100 parts of water, 4 parts of magnesium hydroxide and 0.05 part of sodium laurate, and the reaction mixture was suspended in the aqueous dispersion by stirring. Then, the temperature was elevated to 120° C. and suspension polymerization was conducted for 5 hours. The resulting polymer particles were cooled, and the dispersant was decomposed by hydrochloric acid and the resulting product was washed with water and dried. The so obtained graft copolymer is designated as "graft copolymer (A)-2."

The average rubber particle size of the graft copolymer (A)-2 was 0.37 μ.

Graft Copolymer (A)-3:

| Components | |
|---|---|
| Styrene-butadiene rubber (Tafden 2000A manufactured by Asahi Kasei Kogyo) | 35 parts |
| Styrene | 75 parts |
| Acrylonitrile | 25 parts |
| Benzoyl peroxide | 0.15 part |
| Dicumyl peroxide | 0.08 part |
| t-Dodecyl mercaptan | 0.35 part |

The graft copolymer (A)-3 was prepared by using the above mentioned components and in the same manner as in the graft copolymer (A)-1. The average rubber particle size of the resulting copolymer was 0.7 μ.

Graft Copolymer (B)-1:

A graft copolymer (B) was prepared by using a polybutadiene rubber latex (having a rubber concentration of 50%) synthesized according to a known method and the following components:

| Polybutadiene latex | 30 parts |
|---|---|
| Styrene | 72 parts |
| Acrylonitrile | 28 parts |
| Potassium persulfate | 0.5 part |
| t-Dodecyl mercaptan | 0.5 part |
| Sodium salt of heterogeneous rosin acid | 2 parts |
| Water | 170 parts |

In a reaction vessel equipped with a stirrer was charged 150 parts of water containing, dissolved therein, the rubber latex, mercaptan, monomer mixture and sodium salt of heterogeneous rosin acid, and the temperature was elevated to 60° C. At this temperature, 20 parts of water containing potassium persulfate dissolved therein was added over a period of 3 hours. Polymerization was further conducted for 3 hours at 60° C. Hydrochloric acid was added to the resulting graft polymer and the temperature was elevated to coagulate the polymer, followed by dehydration, washing and drying. The so formed graft copolymer is designated as "graft copolymer (B)-1." The average rubber particle size of the copolymer (B)-1 was 0.1 to 0.2 μ.

Graft Copolymer (B)-2:

A graft copolymer was prepared in the same manner as described above with respect to the graft copolymer (B)-1 except that the amount of the polybutadiene latex was changed to 50 parts and the amount of t-dodecyl mercaptan was changed to 0.6 part. The resulting polymer is designated as "graft copolymer (B)-2". The average rubber particle size of the graft copolymer (B)-2 was 0.2 to 0.2 μ.

| [Preparation of Styrene-Acrylonitrile Copolymer] | |
|---|---|
| Styrene | 72 parts |
| Acrylonitrile | 28 parts |
| Lauroyl peroxide | 0.34 part |
| t-Dodecyl mercaptan | 0.30 part |

A reaction vessel equipped with a stirrer was charged with 100 parts of water in which 0.5 part of hydroxyapatite and 0.01 part of sodium laurate were dissolved and dispersed, and the above monomer mixture was added to the aqueous dispersion and suspended therein by stirring. The temerature was elevated to 72° C. and suspension polymerization was conducted for 10 hours. The resulting polymer particles were cooled, and the dispersant was decomposed by hydrochloric acid and the resulting product was washed with water and dried to obtain a styrene-acrylonitrile copolymer.

EXAMPLE 1

First, 85 parts of the graft copolymer (A)-1 prepared in Referential Example and 15 parts of the graft copolymer (B)-1 prepared in Referential Example were preliminarily blended with 5 parts of chlorinated polyethylene having a degree of chlorination of 35% (Daisolac G-235 manufactured by Osaka Soda), 18 parts of tetrabromo-bisphenol A, 5 parts of antimony trioxide, 0.3 part of triphenyl phosphite as a stabilizer and 1 part of dibutyl tin maleate, and then, the blend was pelletized by an extruder and molded into test pieces by an injection molding machine (the molding temperature being 210° C.). Physical properties of the resulting test pieces were determined.

EXAMPLE 2

Test pieces were prepared in the same manner as described in Example 1 except that the amounts of the graft copolymer (A)-1 and graft copolymer (B)-1 were changed to 70 parts and 30 parts, respectively. Physical properties of these test pieces were determined.

EXAMPLE 3

Test pieces were prepared in the same manner as described in Example 1 except that each of the amounts of the graft copolymers (A)-1 and (B)-1 was changed to 50 parts. Physical properties of these Test pieces were determined.

EXAMPLE 4

Test pieces were prepared in the same manner as described in Example 1 except that the amounts of the graft copolymers (A)-1 and (B)-1 were changed to 30 parts and 70 parts, respectively. Physical properties of these test pieces were determined.

COMPARATIVE EXAMPLE 1

Test pieces were prepared in the same manner as described in Example 2 except that the graft copolymer (A)-1 was not used and the amount of the graft copolymer (B)-1 was changed to 100 parts. Physical properties of these test pieces were determined.

Results obtained in Examples 1 to 4 and Comparative Example 1 are shown in Table 1.

Table 1

|  | Tensile strength (kg/cm$^2$) | Impact strength (kg . cm/cm) | Discoloration | Combustibility 1/8" thickness | Combustibility 1/16" thickness |
|---|---|---|---|---|---|
| Example 1 | 450 | 9.7 | o | 94V - 0 | 94V - 0 |
| Example 2 | 450 | 10.2 | o | 94V - 0 | 94V - 0 |
| Example 3 | 440 | 9.8 | o | 94V - 0 | 94V - 0 |
| Example 4 | 440 | 9.3 | o | 94V - 0 | 94V - 0 |
| Comparative Example 1 | 400 | 7.8 | x | HB | HB |

The tensile strength in Table 1 is one determined according to the method of ASTM D-638, the impact strength is one determined according to the method of ASTM D-256, and the combustibility is one determined according to the method of UL Standard No. 94.

The discoloration was evaluated based on the naked eye observation.

Methods of determining the physical properties in subsequent Examples were the same as the above-mentioned methods.

In Examples 1 to 4, resinous compositions having good mechanical and thermal properties, high flame retardancy and the gloss of the mold article were obtained but in Comparative Example 1, even though the same flame retardant system was employed, the flame retardancy was insufficient.

EXAMPLE 5

Test pieces were prepared in the same manner as described in Example 2 except that the amount of the chlorinated polyethylene was changed to 8 parts. Physical properties of these test pieces were determined to obtain results shown in Table 2.

EXAMPLE 6

Test pieces were prepared in the same manner as described in Example 2 except that the amount of the chlorinated polyethylene was changed to 10 parts. Physical properties of these test pieces were determined to obtain results shown in Table 2.

COMPARATIVE EXAMPLES 2, 3, 4, and 5

Test pieces were prepared in the same manner as described in Example 2 except that the amount of the chlorinated polyethylene was changed as shown in Table 2 and instead of tetrabromo-bisphenol A, hexabromobenzene was used in an amount indicated in Table 2. Physical properties of these test pieces were determined to obtain results shown in Table 2.

Table 2

| | Flame Retardant System | | | |
|---|---|---|---|---|
| | Chlorinated polyethylene (parts) | Halogen-containing flame retardant Kind | Halogen-containing flame retardant Amount (parts) | Sb$_2$O$_3$ (parts) |
| Example 2 | 5 | tetrabromo-bisphenol A | 18 | 5 |
| Example 5 | 8 | " | 18 | 5 |
| Example 6 | 10 | " | 18 | 5 |
| Comparative | | | | |

Table 2-continued

| | | | | |
|---|---|---|---|---|
| Example 2 | 20 | " | 18 | 5 |
| Comparative Example 3 | 30 | " | 18 | 5 |
| Comparative Example 4 | 10 | hexabromo-benzene | 11 | 5 |
| Comparative Example 5 | 30 | " | 11 | 5 |

| | Tensile strength (kg/cm$^2$) | Impact strength (kg.cm/cm) | Discoloration | Combustibility 1/8" thickness | 1/16" thickness |
|---|---|---|---|---|---|
| Example 2 | 450 | 10.2 | o | 94V - 0 | 94V - 0 |
| Example 5 | 440 | 11.5 | o | 94V - 0 | 94V - 0 |
| Example 6 | 440 | 12.6 | o | 94V - 0 | 94V - 0 |
| Comparative Example 2 | 420 | 15.1 | Δ | 94V - 0 | HB |
| Comparative Example 3 | 400 | 18.3 | Δ | 94V - 0 | HB |
| Comparative Example 4 | 450 | 8.9 | o | HB | HB |
| Comparative Example 5 | 410 | 13.8 | Δ | 94V - 0 | HB |

As compared with high flame-retardant resinous compositions of Examples 2, 5 and 6 having excellent physical properties, the flame retardancy of the resinous compositions obtained in Comparative Examples 2 and 3 was reduced. More specifically, the flame retardancy was only 94V - 0 at ⅛" thickness and burning was caused at 1/16 "thickness. In Comparative Examples 4 and 5 where hexabromobenzene was used in amounts corresponding to the bromine amounts in tetrabromo-bisphenol A used in Examples 2, 5 and 6, the flame retardant effect was inferior to that attained by tetrabromobisphenol A and hexabromobenzene did not show at all such a specificity to the amount used of chlorinated polyethylene, as is possessed by tetrabromobisphenol A.

EXAMPLE 7

Test pieces were prepared in the same manner as described in Example 2 except that 70 parts of the graft copolymer (A)-1 obtained in Referential Example and 30 parts of the graft copolymer (B)-2 obtained in Referential Example were used. Physical properties of these test pieces were determined to obtain results shown in Table 3.

EXAMPLE 8

Test pieces were prepared in the same manner as described in Example 2 except that the graft copolymer (A)-1, graft copolymer (B)-2 and styrene-acrylonitrile copolymer obtained in Referential Example were used in amounts of 30 parts, 40 parts and 30 parts, respectively. Physical properties of these test pieces were determined to obtain results shown in Table 3.

EXAMPLE 9

Test pieces were prepared in the same manner as described in Example 2 except that 70 parts of the graft copolymer (A)-2 and 30 parts of the graft copolymer (B)-2 were used. Physical properties of these test pieces were determined to obtain results shown in Table 3.

Table 3

| | Tensile strength (kg/cm$^2$) | Impact strength (kg.cm/cm) | Discoloration | Combustibility 1/8" thickness | 1/16" thickness |
|---|---|---|---|---|---|
| Example 7 | 420 | 20.3 | o | 94V - 0 | 94V - 0 |
| Example 8 | 450 | 16.8 | o | 94V - 0 | 94V - 0 |
| Example 9 | 450 | 11.0 | o | 94V - 0 | 94V - 0 |

EXAMPLES 10, 11 and 12

There were blended 100 parts by weight of the bulk-suspension ABS resin (A)-3 prepared in Reference Example, chlorinated polyethylene having a chlorine content of 35 wt % (Daisolac G-235-Trade Mark-produced by Osaka Soda) in such an amount as shown in Table 4, 5 parts by weight of antimony trioxide, 16 parts by weight of tetrabromobisphenol A (TBA), 0.3 part by weight of triphenylphosphite and 1 part by weight of dibutyl tin maleate. The obtained blend was extruded into pellets and then test pieces were obtained by injection molding from the pellets, at 210° C. Properties of pieces were measured and results are shown in Table 4.

COMPARATIVE EXAMPLES 6 and 7

Test pieces were obtained in the same manner as in Example 10, except for an amount of the chlorinated polyethylene as shown in Table 4, that is, 18 parts and 25 parts. Results of measurement of their properties are shown in Table 4.

COMPARATIVE EXAMPLE 8

Test pieces were obtained in the same manner as in Example 10, except that 10 parts by weight of hexabromobenzene (HBB) was used instead of tetrabromobisphenol A. Results of measurement of their properties are shown in Table 4.

Table 4

| | ABS resin | Chlorinated poly-ethylene | Organic flame retarding agent | Amount | Antimony trioxide | Tensile strength (kg/cm$^2$) | Impact strength (kg . cm/mc) | Combustibility 1/8" thickness | 1/16" thickness |
|---|---|---|---|---|---|---|---|---|---|
| Example 10 | 100 | 5 | TBA | 16 | 5 | 410 | 7.5 | 94V - 0 | 94V - 1 |
| Example 11 | 100 | 8 | " | " | " | 400 | 8.0 | 94V - 0 | 94V - 0 |
| Example 12 | 100 | 10 | " | " | " | 400 | 9.2 | 94V - 0 | 94V - 0 |
| Comparative Example 6 | 100 | 18 | " | " | " | 390 | 12.0 | 94V - 0 | 94 HB |
| Comparative Example 7 | 100 | 25 | " | " | " | 360 | 14.2 | 94V - 0 | 94 HB |
| Comparative Example 8 | 100 | 5 | HBB | 10 | 5 | 430 | 6.5 | 94 HB | 94 HB |

What we claim is:

1. A flame-retardant impact-resistant resinous composition consisting essentially of 100 parts by weight of a graft copolymer component consisting essentially of at least 20% by weight of (A) a graft copolymer obtained by polymerizing an aromatic monoalkenyl monomer with a monomer selected from the group consisting of a vinylcyano monomer, a monomeric alkyl ester of acrylic ester or methacrylic acid, and mixtures thereof in the presence of a diene type rubber component, under bulk polymerization conditions and continuing the polymerization under suspension polymerization conditions to substantially complete the polymerization, and up to 80% by weight of (B) a graft copolymer obtained by polymerizing an aromatic monoalkenyl monomer, with a monomer selected from the group consisting of a vinylcyano monomer, a monomeric alkyl ester of acrylic acid or methacrylic acid and mixture thereof with a diene type rubber latex under emulsion polymerization conditions, 1 to 12 parts by weight of (C) a chlorinated polymer having a degree of chlorination of 25 to 45% by weight and selected from the group consisting of chlorinated polyethylene, chlorinated ethylene-propylene copolymer and chlorinated ethylene-butene copolymer, 5 to 25 parts by weight of (D) tetrabromo-bisphenol A or a derivative thereof and 2 to 10 parts by weight of (E) antimony trioxide.

2. A composition as claimed in claim 1 wherein said graft copolymer component consists of the graft copolymer (A).

3. A composition as claimed in claim 1 wherein said graft copolymer component consists of 20 to 90% by weight of the graft copolymer (A) and 10 to 80% by weight of the graft copolymer (B).

4. A composition as claimed in claim 1 wherein the graft copolymer (A) is obtained by polymerizing an aromatic monoalkenyl monomer and a vinylcyano monomer in the presence of a diene type rubber component under bulk polymerization conditions and continuing the polymerization under suspension polymerization conditions to substantially complete the polymerization.

5. A composition as claimed in claim 3 wherein said aromatic monoalkenyl monomer is styrene, said vinylcyano monomer is acrylonitrile, said diene type rubber component is polybutadiene or butadiene-styrene copolymer and said diene type rubber latex is polybutadiene latex.

6. A composition as claimed in claim 2 in which said chlorinated polymer is chlorinated polyethylene used in an amount of from 3 to 12 parts.

7. A composition as claimed in claim 3 in which said chlorinated polymer is chlorinated polyethylene used in an amount of from 3 to 12 parts.

* * * * *